United States Patent
Farrell et al.

(10) Patent No.: US 12,169,903 B2
(45) Date of Patent: *Dec. 17, 2024

(54) PLANET-SCALE POSITIONING OF AUGMENTED REALITY CONTENT

(71) Applicant: YouAR INC., Portland, OR (US)

(72) Inventors: Brandon P. Farrell, Medford, OR (US); Carlo J. Calica, Brush Prairie, WA (US)

(73) Assignee: YouAR INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,611

(22) Filed: Oct. 18, 2022

(65) Prior Publication Data

US 2023/0169736 A1 Jun. 1, 2023

Related U.S. Application Data

(63) Continuation of application No. 17/137,263, filed on Dec. 29, 2020, now Pat. No. 11,475,643, which is a continuation of application No. 16/374,426, filed on Apr. 3, 2019, now Pat. No. 10,878,632, which is a
(Continued)

(51) Int. Cl.
| | |
|---|---|
| *G06T 17/05* | (2011.01) |
| *G01S 19/43* | (2010.01) |
| *G06T 1/20* | (2006.01) |
| *G06T 15/00* | (2011.01) |
| *G06T 19/00* | (2011.01) |
| *G09B 5/02* | (2006.01) |
| *G09B 27/08* | (2006.01) |

(52) U.S. Cl.
CPC .............. *G06T 19/006* (2013.01); *G06T 1/20* (2013.01); *G06T 15/005* (2013.01); *G06T 2200/04* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 6,023,654 A | * | 2/2000 | Mohlenkamp | ......... G01C 21/26 340/988 |
| 9,307,360 B1 | * | 4/2016 | Zhyshko | ................. H04W 4/02 |

(Continued)

OTHER PUBLICATIONS

Zachary Wartell et al., "Precision Markup Modeling and Display in a Global Geospatial Environment", Proceedings of SPIE vol. #5097 Geo-Spatial and Temporal Image and Data Exploitation III, AeroSense Technologies and Systems for Defense and Security, Apr. 21-25, 2003, Orlando, Florida USA (Year: 2003).*

*Primary Examiner* — Tize Ma
(74) *Attorney, Agent, or Firm* — Kolitch Romano Dascenzo Gates LLC

(57) ABSTRACT

Cell-based augmented reality (AR) content positioning systems may include a reference grid of cells, each of which includes a 32-bit intracellular coordinate system based on a respective reference point of the cell. Cell topology is selected such that the intracellular coordinate systems may utilize single-precision floating point numbers while retaining the ability to define content positions with, e.g., millimeter-level precision. Accordingly, rendering of AR content may be performed at a high precision using 32-bit devices and methods.

20 Claims, 8 Drawing Sheets

Related U.S. Application Data continuation-in-part of application No. 15/835,387, filed on Dec. 7, 2017, now Pat. No. 10,255,728.

(60) Provisional application No. 62/566,185, filed on Sep. 29, 2017.

(56) References Cited

U.S. PATENT DOCUMENTS

| | | | |
|---|---|---|---|
| 2014/0248950 A1* | 9/2014 | Tosas Bautista | G06F 3/01 463/31 |
| 2014/0267261 A1* | 9/2014 | Samavati | G06T 17/20 345/423 |

* cited by examiner

PLANET-SCALE POSITIONING OF AUGMENTED REALITY CONTENT

CROSS-REFERENCES

The following applications and materials are incorporated herein, in their entireties, for all purposes: U.S. Provisional Patent Application Ser. No. 62/566,185, filed Sep. 29, 2017; U.S. patent application Ser. No. 15/835,387, filed Dec. 7, 2017; U.S. patent application Ser. No. 16/374,426, filed Apr. 3, 2019; and U.S. patent application Ser. No. 17/137,263, filed Dec. 29, 2020.

FIELD

This disclosure relates to systems and methods for positioning computer-generated augmented reality content with improved precision and accuracy.

INTRODUCTION

Augmented reality (AR) (also known as mixed reality, or MR) is a live view of a real-world environment that includes supplemental computer-generated elements such as sound, video, graphics, and text. For example, a user can use a mobile device or digital camera to view a live image of a real-world location, and the mobile device or digital camera may create an AR experience by displaying computer-generated elements over the live image of the real world. The device presents the augmented reality to a viewer as if the computer-generated content was a part of the real world.

An AR application may overlay or integrate any computer-generated information with the live view of the real-world environment. This augmented reality scene can be displayed on many types of devices, including computers, phones, tablets, pads, headsets, head-up displays (HUDs), glasses, visors, and/or helmets. AR objects in the scene may be rendered by a graphics processing unit (GPU) of the device. The GPU renders each AR object at a location inside a defined positioning range with a given positioning accuracy. If the positioning accuracy and/or precision is low, the position of a displayed AR object may fluctuate each time the object is rendered, or simply not align properly with the environment, thereby disrupting the user experience.

However, the positioning accuracy/precision of an AR application may be limited by the graphics systems with which the application's AR objects are rendered. Graphics processing units (GPUs) are typically optimized for fast performance in computations with numbers having 32-bit (single) precision. Consequently, due to the way single-precision numbers are stored, an AR application using a GPU to position AR objects can define the location of those objects with a resolution of about 1 in 2^23. For large-scale AR applications in which the positioning range covers a significant geographic distance, 32-bit resolution is insufficient. Using greater bit-precision such as 64-bit doubles, however, would slow even compatible GPUs to unacceptably low performance speeds, increase storage requirements, and cause interoperability issues.

SUMMARY

The present disclosure provides systems, apparatuses, and methods relating to cell-based systems for positioning AR content. In some embodiments, a computer-implemented method for displaying augmented reality content with high precision may include: visualizing, using a graphical processing unit (GPU) of a mobile digital device (MDD), a first augmented reality (AR) representation of a real-world location by presenting a first AR content item incorporated into a live view of the real-world location on a display of the mobile digital device; wherein a position and an orientation of the first AR content item are defined relative to a reference point of a local cell with which the first AR content item is associated; wherein the local cell is defined within a reference grid including a plurality of cells, each cell having a reference point and an intracellular coordinate system having at least millimeter-level precision using only single-precision floating-point coordinates; and wherein the aggregated cells of the reference grid define at least one dimension larger than can be uniquely represented at a millimeter scale by single-precision, floating-point coordinates.

Features, functions, and advantages may be achieved independently in various embodiments of the present disclosure, or may be combined in yet other embodiments, further details of which can be seen with reference to the following description and drawings.

DETAILED DESCRIPTION

Figure 1:
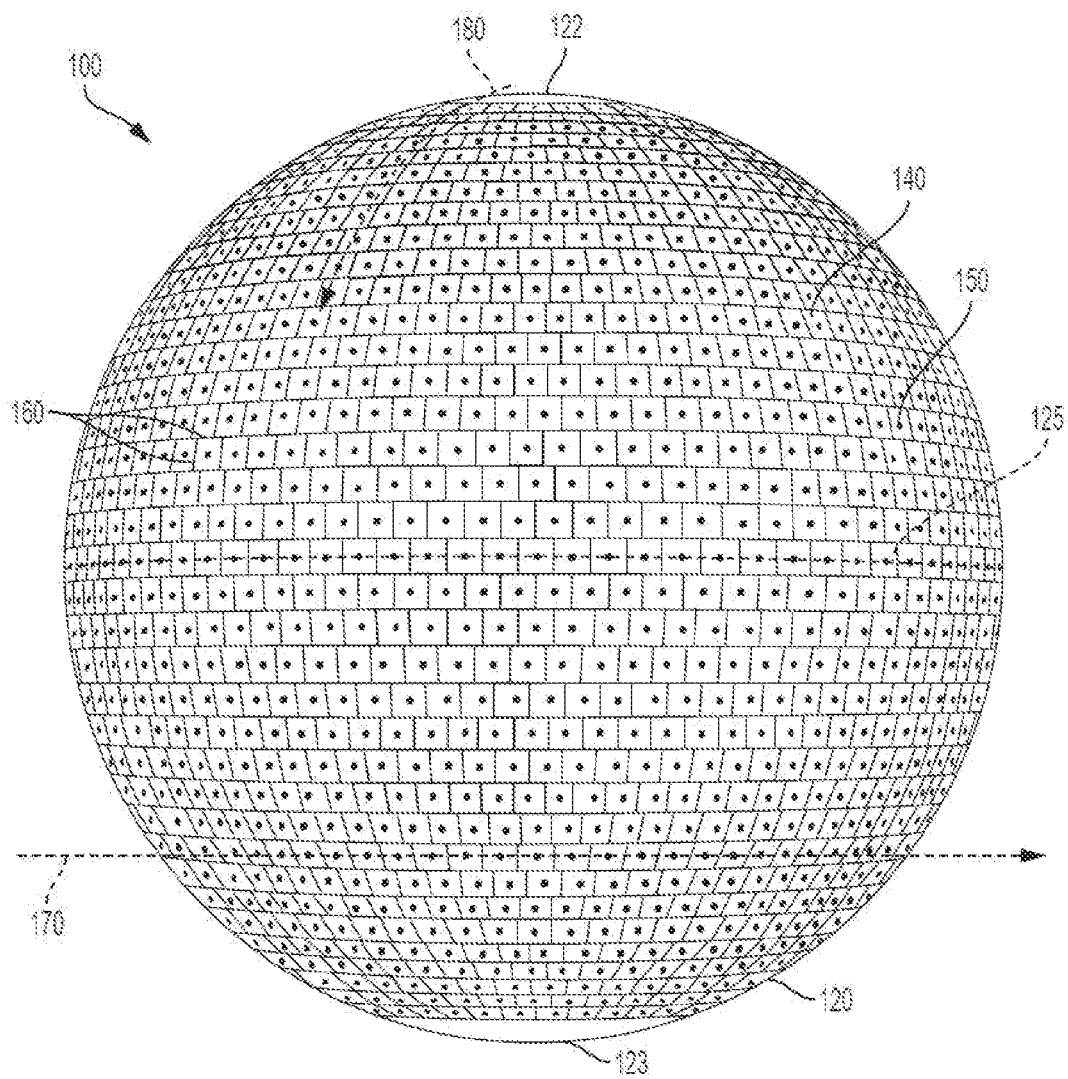
FIG. 1 is a schematic diagram depicting an illustrative cell system for positioning AR content in accordance with aspects of the present disclosure.

Various aspects and examples of a cell-based system for positioning and placing augmented reality (AR) content, as well as related methods, are described below and illustrated in the associated drawings. Unless otherwise specified, a cell-based positioning system and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components, and is not necessarily limited to physical connection(s).

"AR technology" refers to a large group of technologies, including all forms of computer vision, structured light (e.g., infrared, laser), inertial measurement units (IMU) (e.g., gyroscopes, compasses, accelerometers), non-visible waves (e.g., sonar), motion libraries (e.g., pedestrian dead reckoning (PDR)), and/or technologies by which geometry can be ascertained to relate or ground a point or place—and that is used to align AR content (e.g., artwork) or AR events to geometric spatial reality or local physical environment in proximity to any viewer or user of an AR-capable visual device.

"Trackable" refers to a feature (e.g., a physical feature or object in a real-world environment) or set of features (that can be tracked with AR technology) that has been recognized and has had the data which would enable a mobile device to identify the feature and calculate its position relative to the mobile device recorded or stored. In some cases, this data includes an estimated or actual geographic coordinate position, such as WGS coordinates or cell-based coordinates described below. A trackable may provide relative position and pose information to a mobile digital device (MDD).

"AR content" includes any visual, auditory, haptic, or other sensory event created by a user or developer to be experienced in AR, through any number of computing devices. These events may include images, animations, live action footage, programs, code, sounds, or haptic feedback (e.g., vibrations or forces applied to simulate a sense of touch), and the hierarchies of objects (including but not limited to shaders, particles, lights, voxels, avatars, scripts, programs, procedural objects, images, or visual effects) that can make up these events.

An "AR application" is any suitable computer application configured to display (or otherwise present) AR content overlaid on (or incorporated into) a real-time view of a real-world environment. AR applications may be stored in a computer device, which includes at least one local storage device to store the computer application(s) and user data.

"GPS" refers to the global positioning system, and is used herein as shorthand for a useful local or global transmitter network giving coordinate height, longitude, and latitude within a common framework. The well-known global positioning system (GPS) uses a standard geographic coordinate system known as the World Geodetic System (WGS). Accordingly, "GPS coordinates" are substantially identical to WGS coordinates. However, GPS systems have inherent accuracy limitations, and a user's actual geographic position may differ from the coordinates estimated by the GPS system. Although the present disclosure is described with reference to the GPS/WGS system, any similar positioning system may be used interchangeably.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

The present application relates to systems and methods for positioning AR content (also referred to as AR objects) with high real-world accuracy and precision using a GPU and 32-bit coordinates. The system includes a tessellated or tiled layout of cells forming a reference grid that covers most or all of the surface of the planet, as shown schematically in FIG. 1 (at exaggerated scale) and FIG. 2. Each polygonal cell has a well-defined boundary, e.g., rectangular cells have four edges and a length and width. Additionally, each cell has a defined reference point, such as a geometric centroid located at mean sea level (MSL), that serves as the origin for a respective coordinate system local to that cell (i.e., an intracellular coordinate system). The position of an AR object inside the cell is then defined by a multi-dimensional offset from the reference point (e.g., centroid) of the cell. Although the cell is described below as being rectangular or square, any suitable shape and size may be utilized (e.g., triangular, trapezoidal), including sizes of varying dimension. It will be appreciated that the cell is defined by a portion of the planetary surface, idealized as a sphere, and is therefore three-dimensional (see FIG. 3). For convenience, cells described herein are assumed to be square, e.g., having 80-meter sides.

The spatial extent of the cell is small enough (e.g., 80 m×80 m) that storing the offset relative to the centroid in 32-bit resolution corresponds to a very high positioning precision, e.g., millimeter-level or better. Using single-precision numbers, the maximum positive integer is roughly 16.777 million. Accordingly, if one were to use 32-bit numbers as coordinates with millimeter precision, this permits the representation of about 16.777 km or about 10.4 miles of distance—far too small for planetary use, but adequate for sufficiently small volumes. Cell dimensions may therefore be selected to be much less than ten miles, facilitating millimeter precision (or better) without leaving the GPU's single-precision number scheme.

The cell-based AR positioning systems described herein define local, intracellular coordinate systems that can accurately provide geographic position millimeter-level precision using 32-bit numbers. This is despite the fact that the total area encompassed by the cells in aggregate is far too large to allow the same level of precision without the use of higher precision number schemes (e.g., 64-bit numbers).

The cell-based AR positioning system can also be used to easily identify AR objects that are near a user or near each other. In existing AR systems, where position on the Earth's surface is typically defined by a single coordinate system (for example, by WGS coordinates associated with GPS data), complex mathematical calculations are required to identify nearby objects. Such queries place a substantial load on server backends. In cell-based systems of the present disclosure, however, each AR object is located within a relatively small cell, and nearby objects can be identified by simply looking up the contents of the given cell and its neighbors. Moreover, each cell may be assigned a string or integer as a unique identifier (ID), such that queries are based on comparing cell IDs rather than complex distance calculations, providing even greater efficiency.

Figure 2:
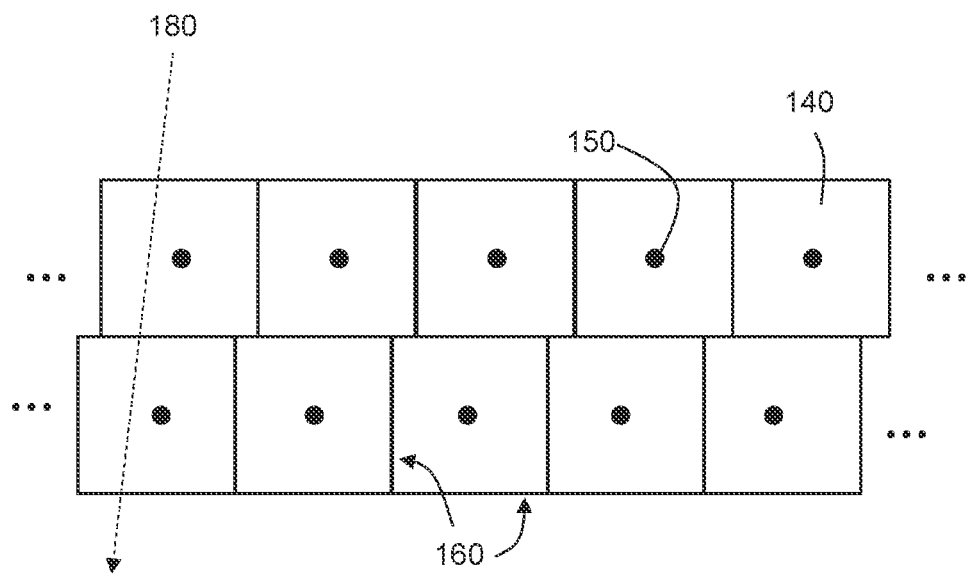
FIG. 2 is a schematic diagram of a portion of the system of FIG. 1.

FIGS. 1 and 2 are schematic diagrams depicting an illustrative cell system for positioning AR content. Cell system 100 includes a plurality of contiguous, tiled, identical cells 140 defined on a surface of a spherical planet or globe 120. In this example, cells 140 are identical squares, but any size and shape may be used. For example, progressively or selectively narrower and/or differently-shaped cells (e.g., trapezoids) may be used toward the poles. Globe 120 may be the Earth. Globe 120 may include a north pole 122, a south pole 123, and an equator 125 disposed halfway between north pole 122 and south pole 123 such that the distance to north pole 122 and the distance to south pole 123 are equal for every point on the equator. Cell system 100 includes a plurality of cells 140, as shown in FIG. 1 (not to scale) and partially in FIG. 2.

Each cell 140 may include a respective reference point. The cell reference point may be any suitable point definable relative to the cell, such as a corner or vertex. In the present example, the reference is a central point or centroid 150. Centroid 150 may be defined as a point located at the geometric center of the cell, on the surface of a sphere defined by a selected radius (e.g., corresponding to mean sea level (MSL)). Each cell 140 is square, having a respective edge length 160. Edge length 160 is the same for all of the cells, and may be any suitable length facilitating the level of precision desired within the cell using floating-point singles for coordinates. In the examples described herein, length 160 is 80 meters. However, many other lengths are suitable for use with the present disclosure, depending on the desired level of precision. For example, if millimeter-level precision is required, any cell size and shape may be utilized that ensures no point considered to be within the cell is greater than about 16.777 km from the reference point. Accordingly, although 80-meter squares are used in the current example, that size is chosen for convenience and could be larger or smaller.

The consistent shape and size of cells 140 (in this example) is distinguished from the shapes defined by lines of latitude and longitude, which change size as one moves farther from the equator. In some examples, as mentioned above, cells 140 may have different sizes or shapes, e.g., a different width depending on the row.

Cells 140 may be configured in rows 170 and columns 180 on the surface of globe 120. In a preferred embodiment, the centroids of all the cells in a given row may define a disc of constant WGS latitude with a circumference or row stride 172. In some examples, different rows 170 may have different numbers of columns, e.g., as a consequence of tiling a sphere using rectangular shapes. Accordingly, in those examples, columns 180 are defined within their respective rows, rather than as a consistent north-south entity. Said another way, when identical cells are utilized, the centroids of all cells in a given column 180 are not located along the same WGS longitude (see FIG. 2). Due to each cell being the same size, the number of cells in each row is greatest near the equator and smallest near the poles. In some examples, cell width, for example, may be varied in a predictable manner to ensure that columns do align.

In some examples, cell system 100 (also referred to as a reference grid or cellular grid) may not cover the entire surface of globe 120, or may be modified in certain regions. For example, rectangular cell tiling may reach a point of infeasibility as one gets closer to the poles. Accordingly, a modification of cell shapes and/or sizes may be implemented to accommodate the extreme ends of the system. In some examples, cells may simply be undefined in the regions near north pole 122 and south pole 123. In those examples, polar regions are not included in the cell-based positioning system. This is generally not considered to be a drawback, as the system can easily cover all human-populated areas, and AR applications are currently not popular in hostile polar environments. However, as mentioned above, other topologies and cell-sizing schemes may be used to avoid this and/or other issues.

Figure 3:
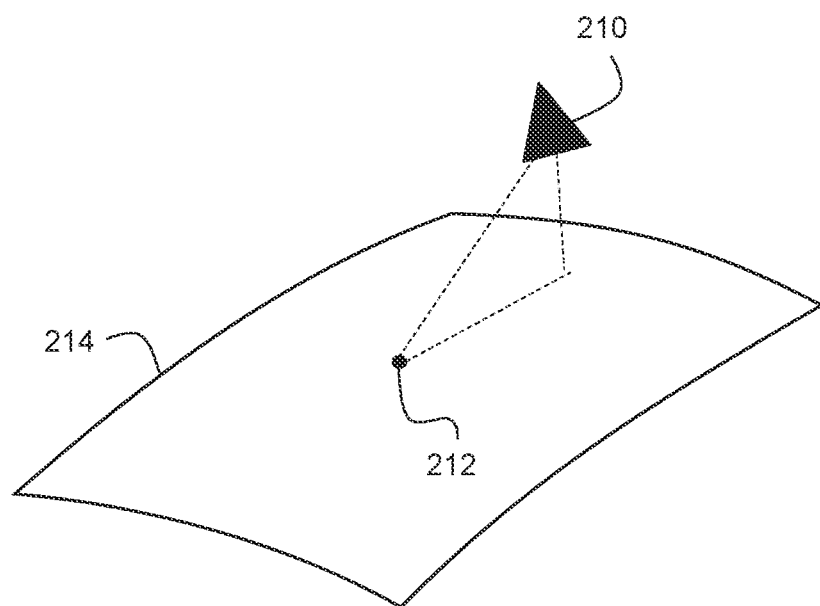
FIG. 3 is a schematic diagram of an illustrative AR object and cell, showing an example of a local cell coordinate system.

FIG. 3 is a schematic diagram depicting an illustrative AR object 210 positioned relative to a centroid 212 of a cell 214 in a system of cells. Cell 214 is an example of cells 140, and defines a portion of the idealized surface of a planet. The position of AR object 210 is defined by an offset from the centroid including three translational degrees of freedom, three rotational degrees of freedom, and a scaling factor. Any suitable coordinate system or systems may be used. For example, the three translational degrees of freedom may be defined by Cartesian axes (X, Y, Z) with an origin at centroid 212, and the three rotational degrees of freedom may be defined by Euler angles (pitch, roll, and yaw). In some examples, a polar coordinate system may be used for translational positioning. In some examples, one or more quaternions may be used for orientation information. In some examples, the scaling factor may be multidimensional.

Displacement (e.g., in the three translational dimensions) and orientation (e.g., in the three rotational dimensions) are expressed relative to the reference point (in this case centroid 212) defined with respect to cell 214. In this example, AR object 210 is above MSL, meaning it may be airborne, or may be placed on a hill or mountain, depending on the actual landscape. AR object 210 is placed with its own reference point (e.g., center) at the defined coordinates. A mesh that may be associated with object 210 can have any size or configuration, and in some cases may cross cell boundaries or encompass multiple cells.

Figure 4:
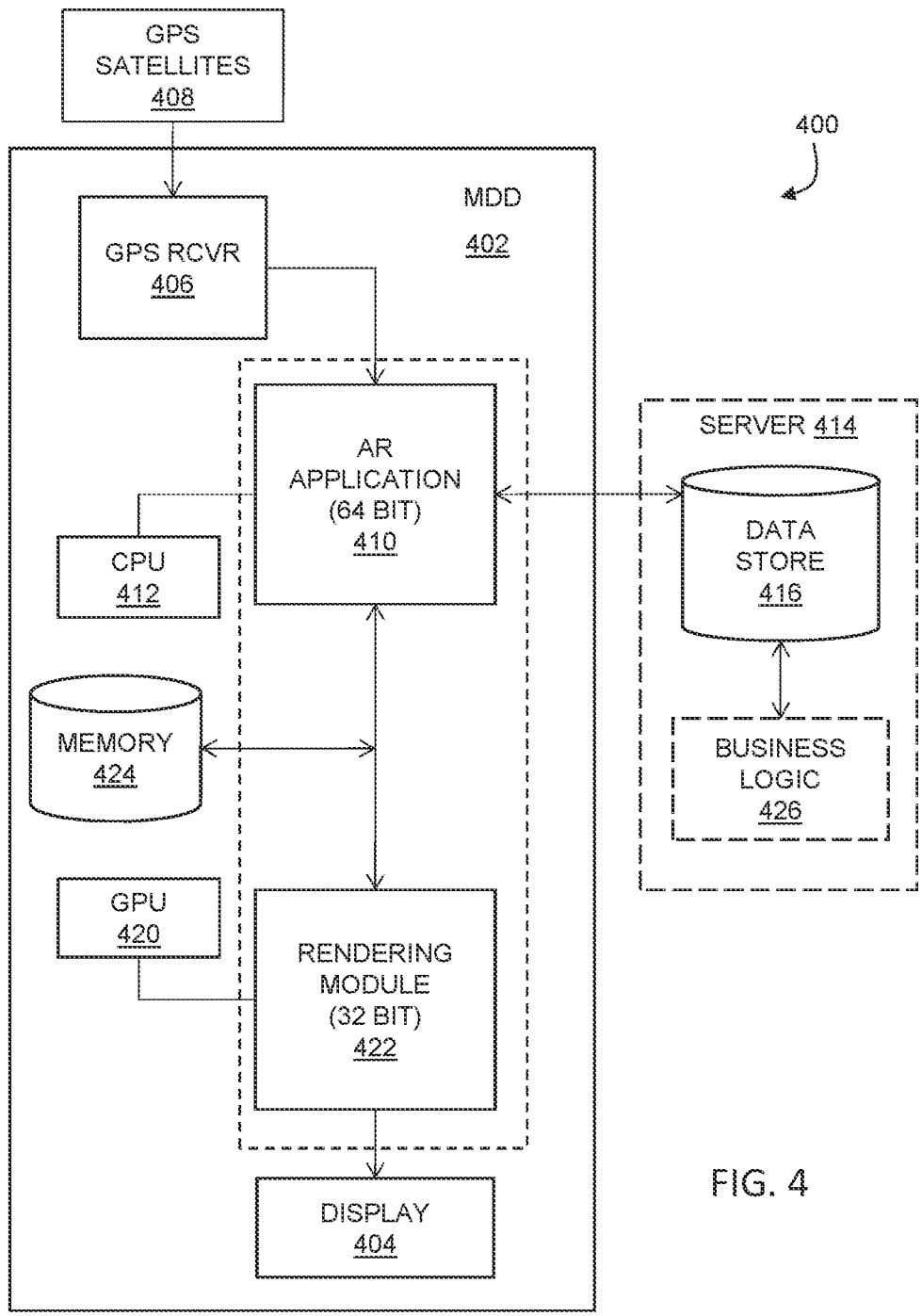
FIG. 4 is a block diagram depicting an illustrative system using a cell-based system for positioning AR content in accordance with aspects of the present disclosure.

FIG. 4 is a block diagram depicting an illustrative AR system 400 using cell-based AR positioning according to the present teachings. In this example, a mobile digital device (MDD) 402 (e.g., a smart phone) is used to receive information about AR content and to selectively display AR content to a user (i.e., on a display 404 of the MDD). The MDD includes a GPS receiver 406 that receives GPS data from a GPS satellite system 408. The GPS data is used by the MDD to calculate the estimated location of the MDD in WGS coordinates (i.e., latitude and longitude). The WGS coordinates are stored in and handled by the MDD as 64-bit data, for example as double-precision floating point numbers. Storage may be carried out using an onboard memory 424 of the MDD.

The MDD includes an AR application 410 that uses a central processing unit (CPU) 412 of the MDD to process information in a 64-bit manner. For example, the AR application may convert the WGS coordinates of the MDD to determine which cell of system 100 the MDD is (likely) in. Neighboring cells may also be identified, as described further below. Unique 64-bit (or 32-bit) strings identifying these cells may then be communicated to a remote server 414, which queries a data store 416 to return 32-bit data (e.g., metadata) describing the AR content (objects, trackables, etc.), in the local and neighboring cells. This AR data includes the coordinates (in 32-bit precision) of each item within its respective cell. The AR content information is stored (e.g., in memory 424) as 32-bit data suitable for rendering, e.g., by a GPU 420 of the MDD. A rendering module 422 or other suitable portion of the AR application may then render AR content using the downloaded 32-bit coordinates and other data. Additional business logic software 426 and related module(s) may be present on server 414.

In some examples, server 414 is selected from among a plurality of available servers for communication with the MDD. The selection of an appropriate server is in some cases based on the cell in which the MDD is determined to be located. For example, each cell of cell system 100 may be assigned to one or more of the servers based on the geographic location of the server (e.g., a cell may be assigned to the closest server), in a one-to-one, one-to-many, or many-to-one relationship. The MDD (e.g., the AR application running on the MDD) may communicate with a server assigned to the cell in which the MDD is located. The cell may be used to distance-check against other querying cells. In this manner, the MDD typically communicates with the server geographically closest to the MDD, which tends to result in a low latency (e.g., a short time interval required for a communication sent by the MDD to reach the server, or vice versa). The low latency improves the AR experience for the MDD user. Selecting the server in this manner may also result in a latency that is consistent among multiple MDDs located in the same cell, which improves an AR experience shared by multiple users.

In some cases, the MDD by default selects the nearest server, but the selection may be overridden if the AR application determines that another server has or may have a lower latency (e.g., due to high levels of activity on the default server, or any other reason latency is not directly correlated with physical distance). For example, after communicating with the nearest server, the AR application may determine that latency with that server is relatively high (e.g., higher than a predetermined threshold or prediction), and may check latency with another server, switch to communicating with another server, and/or take any other suitable action. Alternatively, or additionally, the AR application may check latency with servers other than the default server at predetermined intervals.

Accordingly, the present disclosure describes various aspects of a computer-implemented method for precisely positioning AR content on a planetary scale. This method may include receiving, at a MDD, geographical positioning information corresponding to a real-world location of the MDD on a planet. A reference grid is defined to cover at least a portion of the planet, and the reference grid includes a plurality of cells each having a unique identifier (ID), a boundary, a cell reference point, and an intracellular coordinate system. This system is configured to define intracellular coordinates relative to the cell reference point using only single-precision floating-point numbers. The geographical positioning information may be converted into a local cell ID, which, in some examples, is a string or integer derived from the unique row and column indices of the cell in question. This local cell ID corresponds to a local cell within which the MDD is (estimated to be) located. The local cell ID is communicated to a remote server, which performs a query based on the cell ID, and returns local AR content information. This information includes respective local intracellular coordinates of a local trackable feature and of a local AR content item. The MDD can then be used to establish, based on observation of the local trackable feature using at least one sensor of the MDD, local intracellular coordinates of the MDD itself. Then, using the intracellular coordinates of the MDD and of the local AR content item, an AR representation of the real-world location may be visualized at the MDD (e.g., by a GPU of the MDD) by presenting the local AR content item incorporated into a live view of the real-world location.

The computer-implemented methods described herein may include visualizing, using a graphical processing unit (GPU) of a mobile digital device (MDD), an augmented reality (AR) representation of a real-world location by presenting an AR content item incorporated into a live view of the real-world location on a display of the mobile digital device. A position and an orientation of the AR content item may be defined relative to a reference point of a local cell with which the AR content item is associated. The local cell is defined within a reference grid including a plurality of cells. Each cell has a reference point and an intracellular coordinate system with at least millimeter-level precision, using only single-precision floating-point coordinates. The aggregated cells of the reference grid define at least one dimension larger than can be uniquely represented at a millimeter scale by single-precision, floating-point coordinates.

Examples, Components, and Alternatives

The following sections describe selected aspects of exemplary cell-based AR content positioning systems, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Method of Operation

Figure 5:
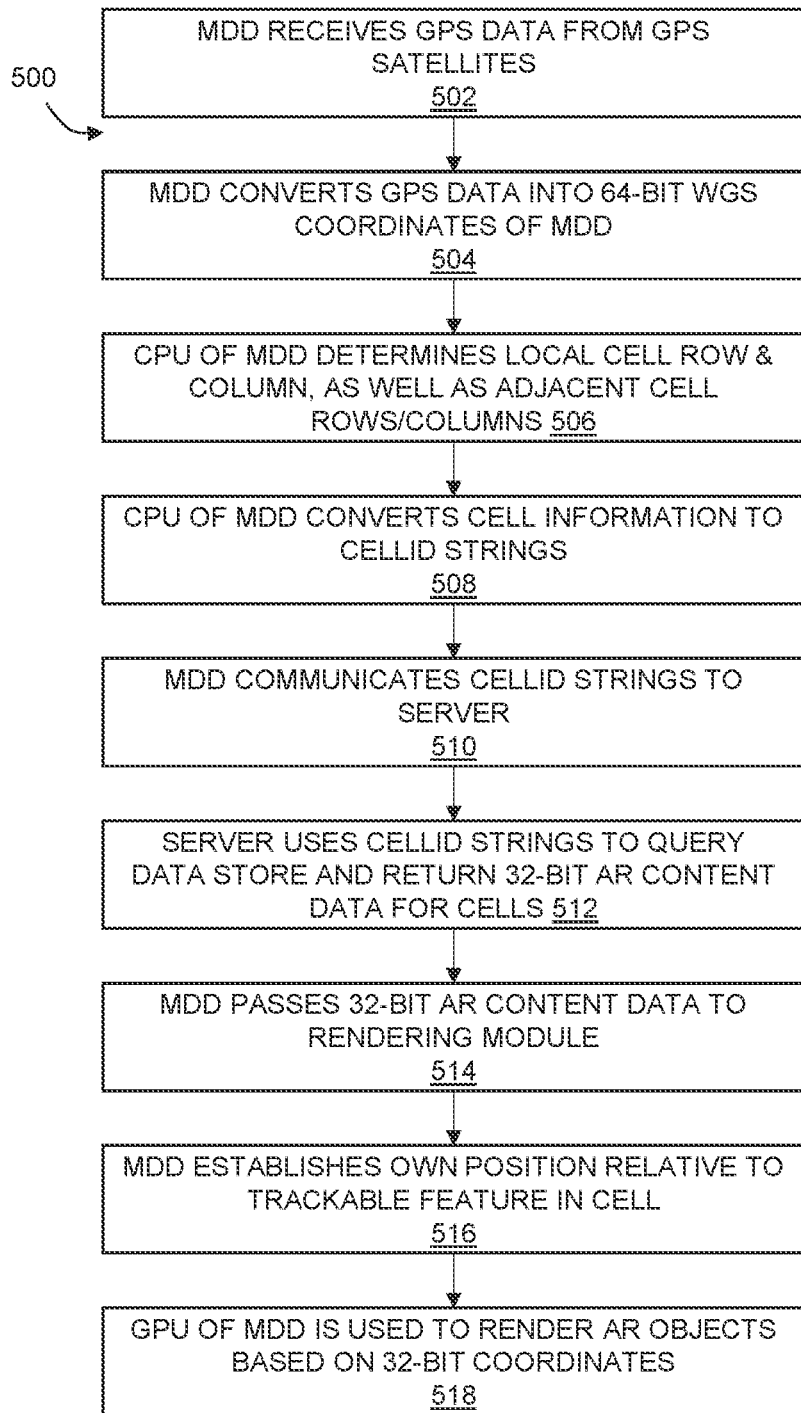
FIG. 5 is a flowchart depicting an illustrative method for using a cell-based system to position AR content.

This section describes steps of an illustrative method for displaying AR content on a mobile digital device using a 32-bit, cell-based positioning system; see FIG. 5. Aspects of systems and methods described above may be utilized in the method steps described below. Where appropriate, reference may be made to components and systems that may be used in carrying out each step. These references are for illustration, and are not intended to limit the possible ways of carrying out any particular step of the method.

FIG. 5 is a flowchart illustrating steps performed in an illustrative method, and may not recite the complete process or all steps of the method. Although various steps of method 500 are described below and depicted in FIG. 5, the steps need not necessarily all be performed, and in some cases may be performed simultaneously or in a different order than the order shown.

At step 502, a mobile digital device (e.g., MDD in FIG. 4) receives GPS data from a GPS system, and, at step 504, determines an estimate of its own position based on the GPS data, using 64-bit WGS coordinates. At step 506, using the estimated WGS coordinates of the MDD (also referred to as a mobile computing device), a CPU of the MDD determines which AR-positioning cell of a global cell system the MDD is in. This conversion is performed by manipulating the latitude and longitude (e.g., WGS coordinates) into cell row and column indices. An example of this process is described further below with respect to FIG. 7.

At step 508, the cell indices are converted to a unique string or integer identifying the cell, namely the cell ID. Steps 506 and 508 are performed for the local cell of the MDD and for a selected number of its neighboring cells. For example, adjacent cells in the same row may be determined by incrementing the column index up or down. Adjacent cells above and below the local cell may be determined by offsetting the WGS coordinates by a selected distance and calculating the proper cell ID. In other words, determining neighbors in the east-west (column index) direction may be as simple as incrementing an index. To determine a neighbor in the north-south (row index) direction, the system may resample from a point outside of the cell boundary (while still inside the local cell space), which is where the neighbor cell is. That resampled location is converted (e.g., cast) to WGS, and then converted back to get the neighbor cell ID. Then using the cell above/below the local cell, the system can increment the column index value (as before) to get additional neighbors. This process may be repeated to obtain a desired number of neighbors.

In some examples, the unique cell identifiers are converted from 32-bit into a base-64 string for convenience in manipulating them. In some examples, cell identifiers are stored as 32-bit unsigned (or signed) integers, which may provide a slight performance increase.

At step 510, the cell IDs (64- or 32-bit cell-identifying strings or integers) are communicated to a server in communication with the MDD. The server, in step 512, uses the strings to perform a simple lookup or query of a data store containing AR content information for each cell, including positions of each item in its respective 32-bit cell coordinates.

At step 514, upon receiving this information, the MDD (e.g., an AR application running on the MDD) stores the AR content data and makes it available to a rendering module or other suitable portion of the AR application.

The AR application and its rendering engine now know the coordinates of all downloaded AR content in the local cells. However, the MDD does not yet know its own position with any level of precision within the local cell coordinate system. Accordingly, at step 516, the MDD establishes its own position by identifying a trackable feature and calculating its relative position and pose. Because the trackable's coordinates are known, this enables the MDD to determine its own coordinates within the cell-based system.

At step 518, a GPU of the MDD is used to place and display AR content using the 32-bit cell-based coordinates.

If a user carries the MDD beyond the boundaries of the local cell, a transformation may be necessary to determine the new cell ID and transition to the new cell's coordinates. For example, if it is determined that the MDD is no longer within the original cell, the MDD's coordinates with respect to the centroid of the original cell may be converted into 64-bit WGS coordinates by the CPU. This would be immediately followed by again determining the new local cell and downloading any additional AR content, if needed, based on new neighboring cells, etc. This temporary foray into 64-bit precision is carried out automatically and is transparent to the GPU, which merely sees a change in the hierarchy (see below).

B. Scene Graph

Figure 6:
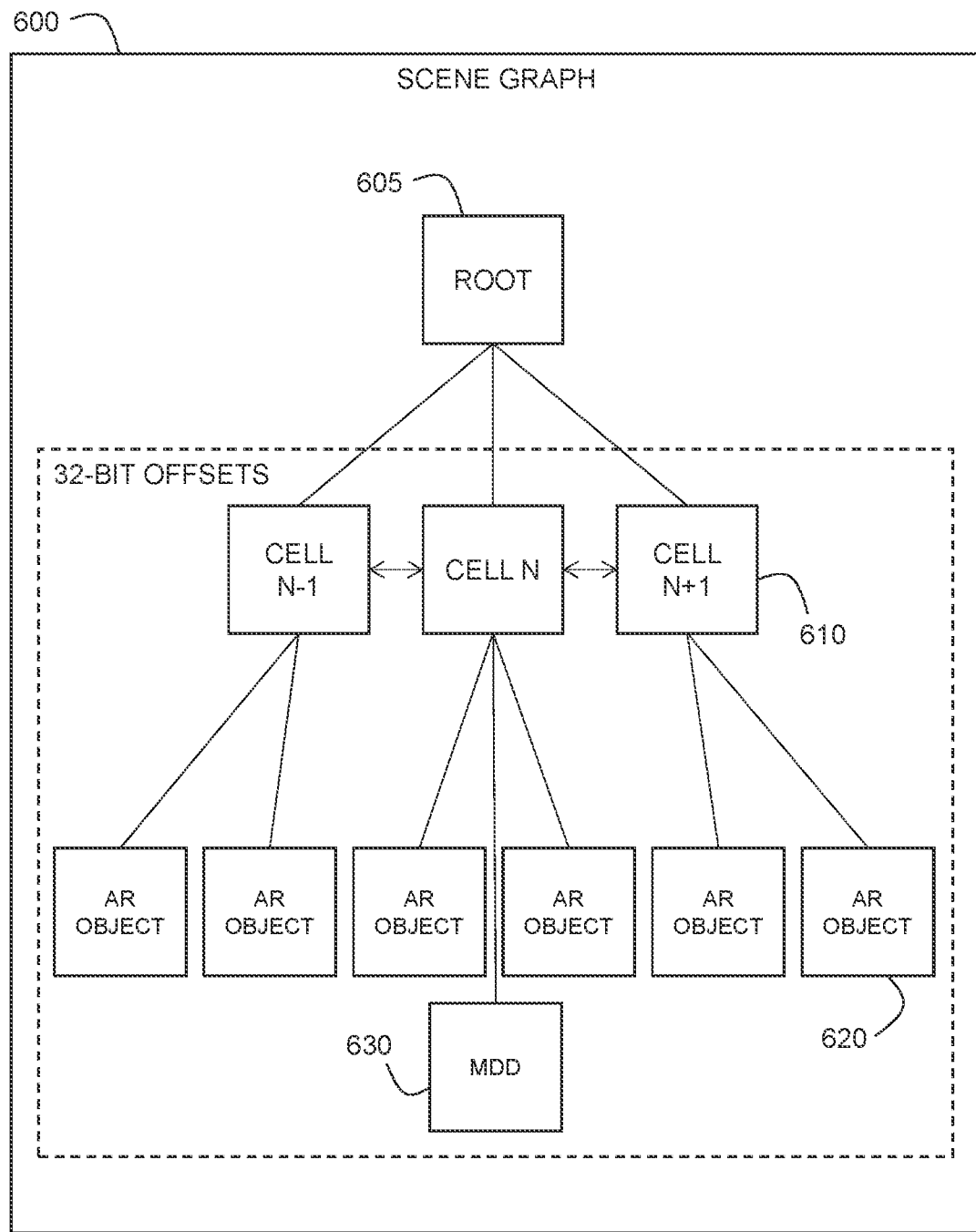
FIG. 6 is a schematic diagram depicting an illustrative scene graph data structure for organizing objects in an AR system using a cell-based system according to the present teachings.

As shown in FIG. 6, this section describes a scene graph suitable for use with aspects of cell-based AR positioning systems described herein.

FIG. 6 is a schematic diagram of a partial scene graph or tree 600. The scene graph contains a root node 605 and a plurality of child nodes of the root node 610, which may also be parent nodes to respective child nodes. Each AR-positioning cell of a global cell system is represented by a cell node 610 that is a child node of the root node 605. Each item of AR content, etc., is represented by an AR object node 620 that is a child node of the cell node 610 that represents the cell in which the AR object is located.

In similar fashion, an MDD (e.g., a smart phone carried by a user of the AR system) is represented as an MDD node 630. Node 630 is a child node of the cell node 610 of the particular cell in which the MDD is physically located at present. The scene graph 600 is thus a data structure that associates each AR object with the cell containing it. An AR app on the MDD can traverse the scene graph 600 to obtain information about AR objects located in all cells or in a subset of cells.

Each cell (e.g., the local and neighboring cells) is loaded into scene graph 600 with its centroid positioned at an offset relative to a scene origin defined by the root node 605, to represent the tiled cell system depicted in FIGS. 1 and 2. For improved efficiency and, in some cases, feasibility, only a subset of the entire cell system (e.g., geographically relevant cells around the MDD) may be loaded into the scene graph at any given time.

The scene origin may be the origin of a coordinate system that encompasses the entire globe. Each AR object is loaded with reference to its parent cell, at a position defined by an offset, in 32-bit coordinates, from the centroid of that cell. Accordingly, AR objects can be placed at an appropriate location in the scene without direct reference to the scene origin, which may be very far away from the AR object. The distance between an AR object and the centroid of its cell is small enough to accurately calculate using single-precision numbers, as required for fast GPU performance. As described above, the offset of an AR object from the centroid of its cell includes information about its location in three-dimensional space, orientation about three rotational axes, and scale.

When an AR object (e.g., an MDD) physically moves from one cell into a new cell, that object's node (e.g., MDD node 630) becomes a child of the node corresponding to the new cell, and is disassociated from the node corresponding to the original cell. As described with reference to FIG. 5, identifying the new cell may require conversion to 64-bit WGS coordinates, which calculations are carried out by a CPU of the MDD (transparent to the GPU).

C. Illustrative Cell Determination Method

This section describes steps of an illustrative method 700 for determining which cell(s) correspond to a given set of WGS coordinates. Aspects of systems and methods described above may be utilized in the method steps described below. Where appropriate, reference may be made to components and systems that may be used in carrying out each step. These references are for illustration, and are not intended to limit the possible ways of carrying out any particular step of the method.

Figure 7:
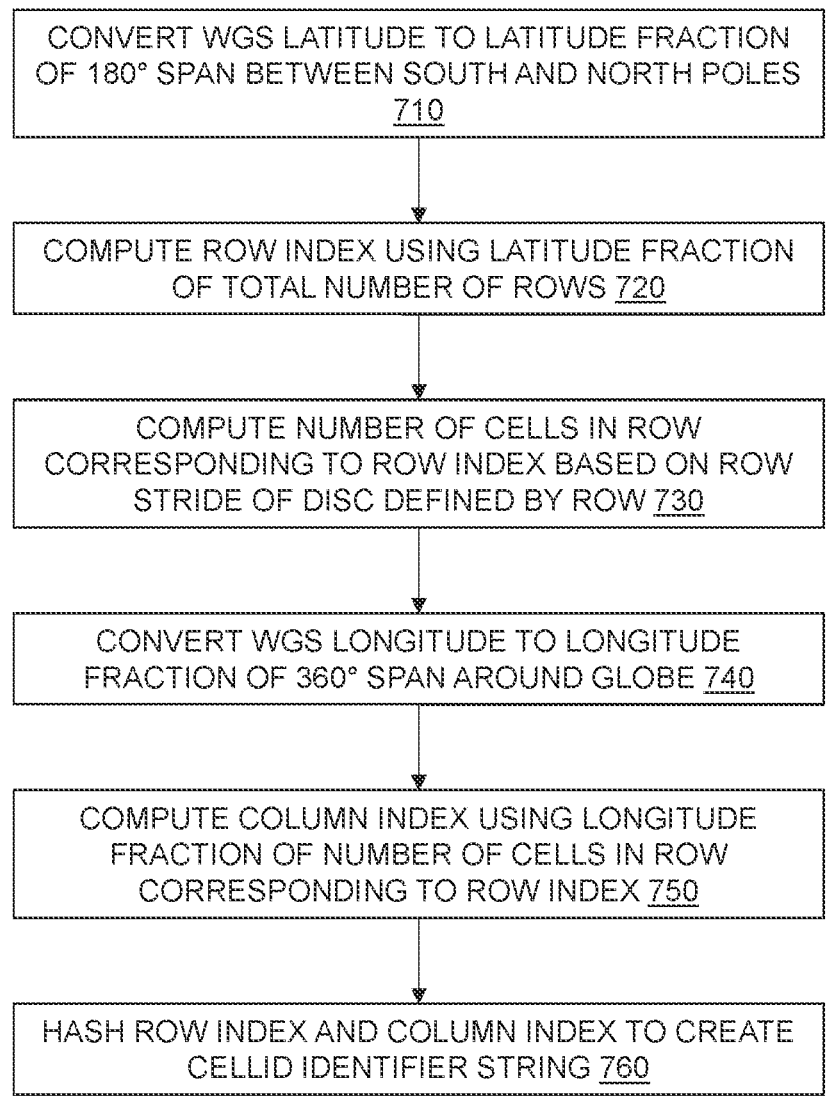
FIG. 7 is a flowchart depicting an illustrative method of using WGS coordinates to obtain corresponding cell row and column indices within a cell-based system according to the present teachings.

FIG. 7 is a flowchart illustrating steps performed in an illustrative method, and may not recite the complete process or all steps of the method. Although various steps of method 700 are described below and depicted in FIG. 7, the steps need not necessarily all be performed, and in some cases may be performed simultaneously or in a different order than the order shown.

At step 710, the method includes converting a WGS latitude coordinate to a fraction of a 180° span starting at a south pole of a globe and ending at a north pole of the globe. The latitude fraction is a number between 0 and 1 indicating how far north of the south pole (or how far south of the north pole) the WGS latitude coordinate lies. An example globe including south and north poles is globe 120 depicted in and described in reference to FIG. 1. For example, if the WGS latitude is 0° (corresponding to any point along the equator of the globe), the latitude fraction will be 0.5, indicating that the WGS latitude coordinate corresponds to a point halfway between the south and north poles. The latitude fraction may be calculated by adding 90° to the latitude coordinate and dividing the sum by 180°.

At step 720, the method includes computing a row index using the latitude fraction. Specifically, the total number of rows in the cell system may be calculated by dividing the distance from pole to pole by the north-south height of each of the cells, and then the total number of rows is multiplied by the latitude fraction to determine which row the original WGS latitude is in. The total number of rows may be calculated by dividing the number of degrees spanned between north and south poles by the number of degrees subtended in the north-south direction by each of the identical cells. The multiplicative product of the total number of rows and the latitude fraction may be rounded, for example by a floor operation, to obtain a row index corresponding to the associated row, where the row indices number the rows sequentially starting with row 1 nearest the south pole. The multiplicative product may be offset by some constant value before or after rounding (e.g., 0.5), which may serve to more distinctly associate the row index with a specific location in a cell of that row.

At step 730, the method includes computing the number of cells included in the row corresponding to the row index. Step 730 may include calculating the radius of the disc defined by the WGS latitude coordinate. For example, the radius of the disc may be calculated by multiplying the radius of the globe by the cosine of the latitude coordinate, and a row stride may be calculated as the circumference of a disc defined by the latitude coordinate. The number of cells in the row may be computed by dividing the row stride by the east-west length of the edge of a cell.

At step 740, the method includes converting a WGS longitude coordinate to a longitude fraction of the 360° span around the globe. The longitude fraction is a number between 0 and 1 indicating how far east or west of a particular longitudinal line (for example, the prime meridian or the antimeridian of Earth) the WGS longitude coordinate lies. The longitude fraction may be computed by adding 180° to the WGS longitude coordinate and dividing the sum by 360°.

At step 750, the method includes computing a column index using the longitude fraction. Specifically, the number of cells in the row corresponding to the WGS latitude (or the row index obtained in step 720) may be multiplied by the longitude fraction and rounded to an integer value, e.g. by a floor operation, to obtain an integral column index. The multiplicative product of the number of rows and the longitude fraction may be offset by some constant value before or after rounding.

At step 760, the method includes hashing the row index and column index with a hash function. The hash function deterministically outputs a cell ID string that uniquely identifies the row index and column index pair and thus uniquely identifies the cell. The cell ID can be used by an MDD to retrieve location-sensitive information from a server, which can perform a simple lookup or query to identify information relevant to the selected cell.

D. Illustrative Data Processing System

Figure 8:
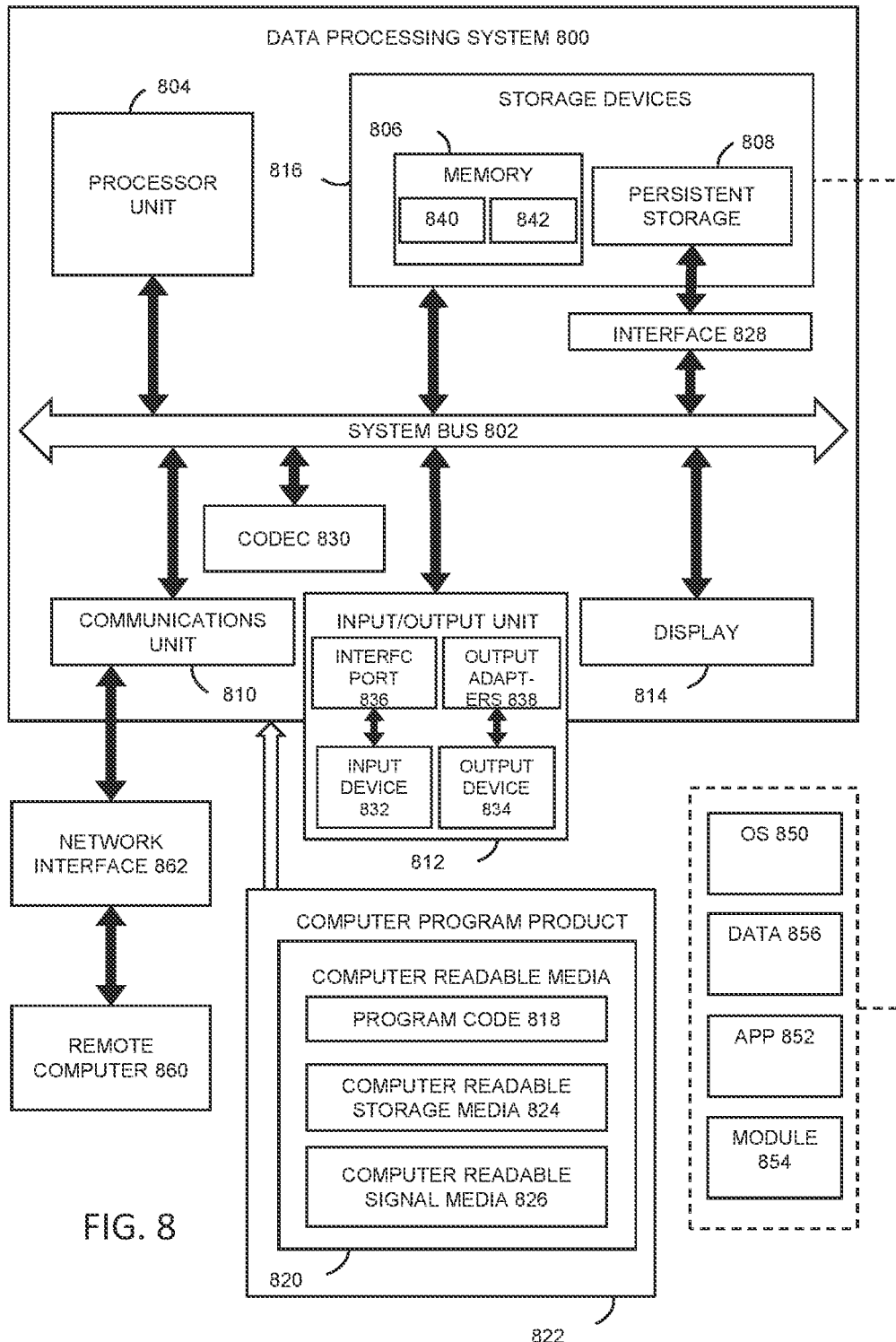
FIG. 8 is a schematic diagram of an illustrative data processing system suitable for use with aspects of the present disclosure.

As shown in FIG. 8, this example describes a data processing system 800 (also referred to as a computer, computing system, and/or computer system) in accordance with aspects of the present disclosure. In this example, data processing system 800 is an illustrative data processing system suitable for implementing aspects of the cell-based AR positioning system. More specifically, in some examples, devices that are embodiments of data processing systems (e.g., smartphones, tablets, personal computers) may be used for running related software applications (e.g., a user's MDD running an AR application or a GPS application) and/or for implementing the server-side applications and systems that provide the functionality described herein.

In this illustrative example, data processing system 800 includes a system bus 802 (also referred to as communications framework). System bus 802 may provide communications between a processor unit 804 (also referred to as a processor or processors), a memory 806, a persistent storage 808, a communications unit 810, an input/output (I/O) unit 812, a codec 830, and/or a display 814. Memory 806, persistent storage 808, communications unit 810, input/output (I/O) unit 812, display 814, and codec 830 are examples of resources that may be accessible by processor unit 804 via system bus 802.

Processor unit 804 serves to run instructions that may be loaded into memory 806. Processor unit 804 may comprise a number of processors, a multi-processor core, and/or a particular type of processor or processors (e.g., a central processing unit (CPU), graphics processing unit (GPU), etc.), depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device may include any suitable hardware capable of storing information (e.g., digital information), such as data, program code in functional form, and/or other suitable information, either on a temporary basis or a permanent basis.

Storage devices 816 also may be referred to as computer-readable storage devices or computer-readable media. Memory 806 may include a volatile storage memory 840 and a non-volatile memory 842. In some examples, a basic input/output system (BIOS), containing the basic routines to transfer information between elements within the data processing system 800, such as during start-up, may be stored in non-volatile memory 842. Persistent storage 808 may take various forms, depending on the particular implementation.

Persistent storage 808 may contain one or more components or devices. For example, persistent storage 808 may include one or more devices such as a magnetic disk drive (also referred to as a hard disk drive or HDD), solid state disk (SSD), floppy disk drive, tape drive, Jaz drive, Zip drive, LS-80 drive, flash memory card, memory stick, and/or the like, or any combination of these. One or more of these devices may be removable and/or portable, e.g., a removable hard drive. Persistent storage 808 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 808 to system bus 802, a removable or non-removable interface is typically used, such as interface 828.

Input/output (I/O) unit 812 allows for input and output of data with other devices that may be connected to data processing system 800 (i.e., input devices and output devices). For example, input device 832 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 804 through system bus 802 via interface port(s) 836. Interface port(s) 836 may include, for example, a serial port, a parallel port, a game port, and/or a universal serial bus (USB).

Output devices 834 may use some of the same types of ports, and in some cases the same actual ports, as input device(s) 832. For example, a USB port may be used to provide input to data processing system 800 and to output information from data processing system 800 to an output device 834. Output adapter 838 is provided to illustrate that there are some output devices 834 (e.g., monitors, speakers, and printers, among others) which require special adapters. Output adapters 838 may include, e.g. video and sounds cards that provide a means of connection between the output device 834 and system bus 802. Other devices and/or systems of devices may provide both input and output capabilities, such as remote computer(s) 860. Display 814 may include any suitable human-machine interface or other mechanism configured to display information to a user, e.g., a CRT, LED, or LCD monitor or screen, etc.

Communications unit 810 refers to any suitable hardware and/or software employed to provide for communications with other data processing systems or devices. While communication unit 810 is shown inside data processing system 800, it may in some examples be at least partially external to data processing system 800. Communications unit 810 may include internal and external technologies, e.g., modems (including regular telephone grade modems, cable modems, and DSL modems), ISDN adapters, and/or wired and wireless Ethernet cards, hubs, routers, etc. Data processing system 800 may operate in a networked environment, using logical connections to one or more remote computers 860. A remote computer(s) 860 may include a personal computer (PC), a server, a router, a network PC, a workstation, a microprocessor-based appliance, a peer device, a smart phone, a tablet, another network note, and/or the like. Remote computer(s) 860 typically include many of the elements described relative to data processing system 800. Remote computer(s) 860 may be logically connected to data processing system 800 through a network interface 862 which is connected to data processing system 800 via communications unit 810. Network interface 862 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 830 may include an encoder, a decoder, or both, comprising hardware, software, or a combination of hardware and software. Codec 830 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 830 is depicted as a separate component, codec 830 may be contained or implemented in memory, e.g., non-volatile memory 842.

Non-volatile memory 842 may include read only memory (ROM), programmable ROM (PROM), electrically programmable ROM (EPROM), electrically erasable programmable ROM (EEPROM), flash memory, and/or the like, or any combination of these. Volatile memory 840 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 816, which are in communication with processor unit 804 through system bus 802. In these illustrative examples, the instructions are in a functional form in persistent storage 808. These instructions may be loaded into memory 806 for execution by processor unit 804. Processes of one or more embodiments of the present disclosure may be performed by processor unit 804 using computer-implemented instructions, which may be located in a memory, such as memory 806.

These instructions are referred to as program instructions, program code, computer usable program code, or computer-readable program code executed by a processor in processor unit 804. The program code in the different embodiments may be embodied on different physical or computer-readable storage media, such as memory 806 or persistent storage 808. Program code 818 may be located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may comprise computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is media that can be touched by a person.

Alternatively, program code 818 may be transferred to data processing system 800, e.g., remotely over a network, using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The computer providing program code 818 may be a server computer, a client computer, or some other device capable of storing and transmitting program code 818.

In some examples, program code 18 may comprise be an operating system (OS) 850. Operating system 850, which may be stored on persistent storage 808, controls and allocates resources of data processing system 800. One or more applications 852 take advantage of the operating system's management of resources via program modules 854, and program data 856 stored on storage devices 816. OS 850 may include any suitable software system configured to manage and expose hardware resources of computer 800 for sharing and use by applications 852. In some examples, OS 850 provides application programming interfaces (APIs) that facilitate connection of different type of hardware and/or provide applications 852 access to hardware and OS services. In some examples, certain applications 852 may provide further services for use by other applications 852, e.g., as is the case with so-called "middleware." Aspects of present disclosure may be implemented with respect to various operating systems or combinations of operating systems.

The different components illustrated for data processing system 800 are not meant to provide architectural limitations to the manner in which different embodiments may be implemented. One or more embodiments of the present disclosure may be implemented in a data processing system that includes fewer components or includes components in addition to and/or in place of those illustrated for computer 800. Other components shown in FIG. 8 can be varied from the examples depicted. Different embodiments may be implemented using any hardware device or system capable of running program code. As one example, data processing system 800 may include organic components integrated with inorganic components and/or may be comprised entirely of organic components (excluding a human being). For example, a storage device may be comprised of an organic semiconductor.

In some examples, processor unit 804 may take the form of a hardware unit having hardware circuits that are specifically manufactured or configured for a particular use, or to produce a particular outcome or progress. This type of hardware may perform operations without needing program code 818 to be loaded into a memory from a storage device to be configured to perform the operations. For example, processor unit 804 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 818) may be implemented as hardware, e.g., by specifying an FPGA configuration using a hardware description language (HDL) and then using a resulting binary file to (re)configure the FPGA.

In another example, data processing system 800 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, system bus 802 may comprise one or more buses, such as a system bus or an input/output bus. Of course, the bus system may be implemented using any suitable type of architecture that provides for a transfer of data between different components or devices attached to the bus system. System bus 802 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in system bus 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

E. Illustrative Distributed Data Processing System

Figure 9:
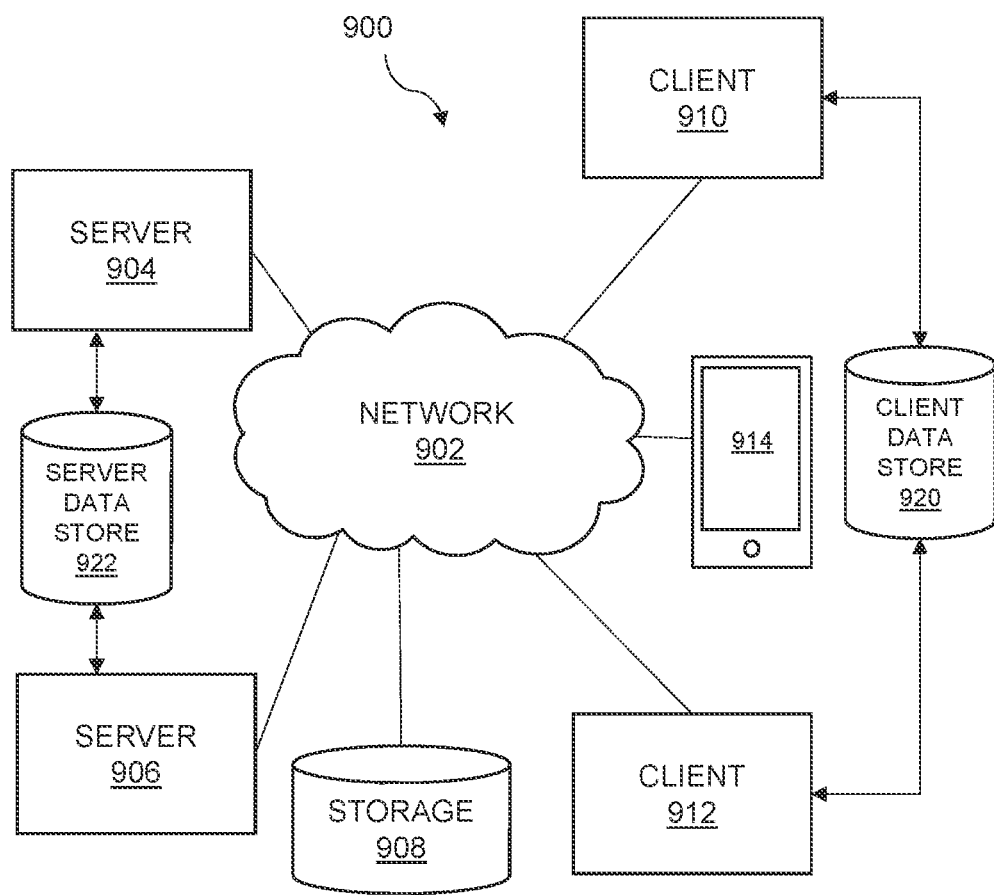
FIG. 9 is a schematic diagram of an illustrative computer network suitable for use with aspects of the present disclosure.

As shown in FIG. 9, this example describes a general network data processing system 900, interchangeably termed a computer network, a network system, a distributed data processing system, or a distributed network, aspects of which may be included in one or more illustrative embodiments of cell-based systems for positioning AR content as described herein. For example, various systems associated with an AR server and/or a user's mobile digital device (e.g., a smart phone) may be networked or connected to a common network (e.g., the Internet) for providing the functionality described above. The user's MDD may transmit information about the MDD's location to an AR server or server system using a distributed network, and may receive information about location-sensitive AR content from the server.

It should be appreciated that FIG. 9 is provided as an illustration of one implementation and is not intended to imply any limitation with regard to environments in which different embodiments may be implemented. Many modifications to the depicted environment may be made.

Network system 900 is a network of devices (e.g., computers), each of which may be an example of data processing system 800, and other components. Network data processing system 900 may include network 902, which is a medium configured to provide communications links between various devices and computers connected within network data processing system 900. Network 902 may include connections such as wired or wireless communication links, fiber optic cables, and/or any other suitable medium for transmitting and/or communicating data between network devices, or any combination thereof.

In the depicted example, a first network device 904 and a second network device 906 connect to network 902, as do one or more computer-readable memories or storage devices 908. Network devices 904 and 906 are each examples of data processing system 800, described above. In the depicted example, devices 904 and 906 are shown as server computers, which are in communication with one or more server data store(s) 922 that may be employed to store information local to server computers 904 and 906, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 910 and 912 and/or a client smart device 914, may connect to network 902. Each of these devices is an example of data processing system 800, described above regarding FIG. 8. Client electronic devices 910, 912, and 914 may include, for example, one or more personal computers, network computers, and/or mobile computing devices such as personal digital assistants (PDAs), smart phones, handheld gaming devices, wearable devices, and/or tablet computers, and the like. In the depicted example, server 904 provides information, such as boot files, operating system images, and applications to one or more of client electronic devices 910, 912, and 914. Client electronic devices 910, 912, and 914 may be referred to as "clients" in the context of their relationship to a server such as server computer 904. Client devices may be in communication with one or more client data store(s) 920, which may be employed to store information local to the clients (e.g., cookie(s) and/or associated contextual information). Network data processing system 900 may include more or fewer servers and/or clients (or no servers or clients), as well as other devices not shown.

In some examples, first client electric device 910 may transfer an encoded file to server 904. Server 904 can store the file, decode the file, and/or transmit the file to second client electric device 912. In some examples, first client electric device 910 may transfer an uncompressed file to server 904 and server 904 may compress the file. In some examples, server 904 may encode text, audio, and/or video information, and transmit the information via network 902 to one or more clients.

Client smart device 914 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones, HMD (head mounted devices/displays)) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 900 may be stored in or on a computer-readable storage medium, such as network-connected storage device 908 and/or a persistent storage 808 of one of the network computers, as described above, and may be downloaded to a data processing system or other device for use. For example, program code may be stored on a computer-readable storage medium on server computer 904 and downloaded to client 910 over network 902, for use on client 910. In some examples, client data store 920 and server data store 922 reside on one or more storage devices 908 and/or 808.

Network data processing system 900 may be implemented as one or more of different types of networks. For example, system 900 may include an intranet, a local area network (LAN), a wide area network (WAN), or a personal area network (PAN). In some examples, network data processing system 900 includes the Internet, with network 902 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 902 may be referred to as a "cloud." In those examples, each server 904 may be referred to as a cloud computing node, and client electronic devices may be referred to as cloud consumers, or the like. FIG. 9 is intended as an example, and not as an architectural limitation for any illustrative embodiments.

F. Additional Examples and Illustrative Combinations

This section describes additional aspects and features of cell-based systems for positioning AR content, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A computer-implemented method for precisely positioning augmented reality content on a planetary scale, the method comprising:

receiving, at a mobile digital device (MDD), geographical positioning information corresponding to a real-world location of the MDD on a planet, wherein a reference grid is defined to cover at least a portion of the planet, the reference grid including a plurality of cells each having a unique identifier (ID), a boundary, a cell reference point, and an intracellular coordinate system configured to define intracellular coordinates relative to the cell reference point using only single-precision floating-point numbers;

converting the geographical positioning information, using the MDD, into a local cell ID, wherein the local cell ID corresponds to a local cell within which the MDD is located;

communicating the local cell ID to a remote server;

receiving, at the MDD from the remote server, based on the local cell ID, local augmented reality (AR) content information including respective local intracellular coordinates of a local trackable feature and of a local AR content item;

establishing, based on observation of the local trackable feature using at least one sensor of the MDD, local intracellular coordinates of the MDD; and visualizing, at the MDD, based on the intracellular coordinates of the MDD and of the local AR content item, an AR representation of the real-world location by presenting the local AR content item incorporated into a live view of the real-world location.

A1. The method of A0, wherein visualizing the AR representation of the real-world location comprises using a graphical processing unit (GPU) of the MDD.

A2. The method of any one of paragraphs A0 through A1, wherein the single-precision, floating-point, intracellular coordinates provide centimeter-level spatial precision or better.

A3. The method of any one of paragraphs A0 through A2, wherein the single-precision, floating-point, intracellular coordinates provide millimeter-level spatial precision.

A4. The method of any one of paragraphs A0 through A3, wherein the portion of the planet covered by the reference grid comprises at least one dimension larger than can be uniquely represented at a centimeter scale by single-precision, floating-point coordinates.

A5. The method of any one of paragraphs A0 through A4, wherein each cell boundary is generally polygonal, and the plurality of cells are tiled to cover at least the portion of the planet.

A6. The method of any one of paragraphs A0 through A5, wherein each cell boundary has a plurality of edges, and each edge is less than approximately 100 meters in length.

A7. The method of any one of paragraphs A0 through A6, wherein each cell boundary is rectangular.

A8. The method of any one of paragraphs A0 through A7, wherein each cell boundary is square.

A9. The method of any one of paragraphs A0 through A8, wherein the geographical positioning data is received from the global positioning system (GPS).

A10. The method of any one of paragraphs A0 through A9, further comprising:

determining a neighbor cell ID corresponding to an adjacent cell with respect to the local cell;

communicating the neighbor cell ID to the remote server; and receiving, at the MDD from the remote server, based on the neighbor cell ID, neighboring AR content information including intracellular coordinates of a neighboring AR content item associated with the adjacent cell.

A11. The method of A10, wherein determining the neighbor cell ID comprises offsetting the geographical positioning information of the MDD by a selected distance to generate an offset position, and converting the offset position, using the MDD, into the neighbor cell ID.

A12. The method of A10, wherein determining the neighbor cell ID comprises incrementing a column index of the local cell.

A13. The method of any one of paragraphs A10 through A12, further comprising:

visualizing, using the GPU of the MDD, based on the intracellular coordinates of the MDD, of the neighboring AR content item, and of the respective reference points of the local cell and the adjacent cell, an AR representation of the real-world location by presenting the neighboring AR content item incorporated into the live view of the real-world location.

A14. The method of any one of paragraphs A0 through A13, wherein each of the plurality of cells in the reference grid has identical dimensions.

A15. The method of any one of paragraphs A0 through A14, wherein the reference grid is defined on an idealized sphere representing the planet, the idealized sphere having a radius corresponding to a mean sea level (MSL).

A16. The method of any one of paragraphs A0 through A15, wherein the reference point of each cell is disposed at MSL.

A17. The method of any one of paragraphs A0 through A15, wherein the reference point of each cell is disposed at a geometric center of the cell.

A18. The method of any one of paragraphs A0 through A15, wherein the reference point of each cell is disposed at a selected corner of the cell.

A19. The method of any one of paragraphs A0 through A18, wherein, for each cell, no point defined as being within the cell is disposed greater than approximately 16.777 kilometers from the reference point.

A20. The method of any one of paragraphs A0 through A19, wherein the intracellular coordinates comprise a three-dimensional coordinate system.

A21. The method of any one of paragraphs A0 through A20, wherein the intracellular coordinates further comprise an orientation component.

A22. The method of A21, wherein the orientation component comprises a roll, a pitch, and a yaw.

A23. The method of A21, wherein the orientation component comprises a plurality of quaternions.

A24. The method of any one of paragraphs A0 through A23, wherein the intracellular coordinates further comprise a scaling factor.

A25. The method of any one of paragraphs A0 through A24, wherein the scaling factor is multidimensional.

A26. The method of A20, wherein the intracellular coordinates comprise a Cartesian coordinate system with the reference point as an origin.

A27. The method of A20, wherein the intracellular coordinates comprise a polar coordinate system with the reference point as an origin.

A28. The method of any one of paragraphs A0 through A27, wherein the cell ID comprises a string.

A29. The method of any one of paragraphs A0 through A28, wherein the cell ID comprises a 32-bit integer.

A30. The method of any one of paragraphs A0 through A29, further comprising determining the cell ID by applying a hashing algorithm to a row index and a column index of the corresponding cell.

A31. The method of any one of paragraphs A0 through A30, wherein the step of visualizing the AR representation of the real-world location is performed on a display of the MDD.

B0. A computer-implemented method for reliably displaying augmented reality content positioned with millimeter-level precision, the system comprising:

dividing a surface of a planet into a reference grid of tiled polygonal cells, each of the cells respectively including a border, a reference point, and an intracellular coordinate system defining positions within the cell using only 32-bit numbers;

estimating a geographical position of a mobile computing device using an onboard global positioning system (GPS) receiver to estimate world geodetic system (WGS) coordinates of the mobile computing device;

converting the WGS coordinates to a row index and a column index of a corresponding local cell in the reference grid;

converting the row index and the column index into a unique cell identifier (ID) of the local cell;

querying a data store using the unique cell ID to return intracellular positions of AR content items associated with the local cell, the AR content items comprising a trackable feature and an AR object;

establishing an intracellular position of the mobile computing device by sensing the trackable feature using at least one sensor of the mobile computing device;

visualizing, using the mobile computing device and based on the intracellular positions of the AR object and of the mobile computing device, an AR representation including the AR object.

B1. The method of B0, wherein visualizing the AR representation includes using a graphical processing unit (GPU) of the mobile computing device.

B2. The method of any one of paragraphs B0 through B1, wherein the AR representation is visualized on a display coupled to the mobile computing device.

B3. The method of any one of paragraphs B0 through B2, wherein converting the WGS coordinates into the row index and the column index of the local cell is performed using a central processing unit (CPU) of the mobile computing device.

B4. The method of any one of paragraphs B0 through B3, wherein converting the row index and the column index into the unique cell identifier (ID) comprises applying a hashing algorithm to the row index and the column index to produce a unique string.

B5. The method of any one of paragraphs B0 through B4, wherein each of the polygonal cells is substantially rectangular.

B6. The method of any one of paragraphs B0 through B5, wherein each of the cells comprises an identically-dimensioned square.

B7. The method of any one of paragraphs B0 through B4, wherein each of the polygonal cells is substantially trapezoidal.

B8. The method of any one of paragraphs B0 through B7, wherein, for each cell, no dimension exceeds 500 meters from the reference point.

B9. The method of any one of paragraphs B0 through B8, wherein each reference point is defined at a same radius of the planet.

B10. The method of B9, wherein the radius corresponds to mean sea level.

B11. The method of any one of paragraphs B0 through B10, wherein each of the reference points is at a geometric center of the respective cell.

B12. The method of any one of paragraphs B0 through B11, wherein the intracellular coordinate system comprises a spatial position and an orientation.

B13. The method of B12, wherein the intracellular coordinate system further comprises a scaling factor.

B14. The method of B13, wherein the scaling factor is a multifactor scaling factor.

C0. A computer-implemented method for displaying augmented reality content with high precision, the method comprising:

visualizing, using a graphical processing unit (GPU) of a mobile digital device (MDD), a first augmented reality (AR) representation of a real-world location by presenting a first AR content item incorporated into a live view of the real-world location on a display of the mobile digital device;

wherein a position and an orientation of the first AR content item are defined relative to a reference point of a local cell with which the first AR content item is associated;

wherein the local cell is defined within a reference grid including a plurality of cells, each cell having a reference point and an intracellular coordinate system having at least millimeter-level precision using only single-precision floating-point coordinates; and wherein the aggregated cells of the reference grid define at least one dimension larger than can be uniquely represented at a millimeter scale by single-precision, floating-point coordinates.

C1. The method of C0, further comprising:

establishing a position and an orientation of the MDD within the intracellular coordinate system of the local cell by observing a known trackable feature of the local cell using at least one sensor of the MDD.

C2. The method of any one of paragraphs C0 through C1, wherein each cell in the plurality of cells is configured such that every point defined to be within the cell is less than approximately 16.777 km of the reference point of the cell.

C3. The method of any one of paragraphs C0 through C2, wherein each cell includes a generally polygonal boundary, and the plurality of cells are tiled to cover at least a portion of the planet.

C4. The method of C3, wherein each cell boundary is substantially rectangular.

C5. The method of C4, wherein each cell boundary is substantially square.

C6. The method of C3, wherein each cell boundary is substantially trapezoidal.

C7. The method of any one of paragraphs C0 through C6, further comprising:

visualizing, using the GPU of the MDD, a second AR representation of the real-world location by presenting a second AR content item of an adjacent cell incorporated into the live view of the real-world location, based on the intracellular coordinates of the MDD, the intracellular coordinates of the AR content item in the adjacent cell, and the intracellular coordinates of the respective reference points of the local cell and the adjacent cell.

C8. The method of any one of paragraphs C0 through C7, wherein each cell of the plurality of cells in the reference grid has identical dimensions.

C9. The method of any one of paragraphs C0 through C8, wherein the reference grid is defined on an idealized sphere representing the Earth, the idealized sphere having a radius corresponding to a mean sea level (MSL).

C10. The method of any one of paragraphs C0 through C9, wherein the reference point of each cell is disposed at MSL.

C11. The method of any one of paragraphs C0 through C9, wherein the reference point of each cell is disposed at a geometric center of the cell.

C12. The method of any one of paragraphs C0 through C11, wherein the intracellular coordinate system comprises a three-dimensional coordinate system.

C13. The method of C12, wherein the intracellular coordinate system further comprises an orientation component.

C14. The method of C13, wherein the orientation component comprises a roll, a pitch, and a yaw.

C15. The method of C13, wherein the orientation component comprises one or more quaternions.

Advantages, Features, Benefits

The different embodiments and examples of the cell-based AR content positioning systems and methods described herein provide several advantages over known solutions for positioning AR content. For example, illustrative embodiments and examples described herein allow high-precision (e.g., millimeter-level) content placement over an arbitrarily large area (including at planetary scales), using 32-bit number formats. Single-precision numbers are used by the vast majority of GPUs, and therefore systems using them offer the greatest degree of usability and interoperability.

Additionally, and among other benefits, illustrative embodiments and examples described herein reduce data storage requirements, as each AR content item can be stored using single-precision numbers, relative to its local cell ID.

Additionally, and among other benefits, illustrative embodiments and examples described herein facilitate reduced bandwidth usage, as only cell IDs need to be communicated from the MDD to the remote server.

Additionally, and among other benefits, illustrative embodiments and examples described herein allow faster and simpler database queries, as only the cell ID is needed to look up local content.

Additionally, and among other benefits, illustrative embodiments and examples described herein eliminate the need for complicated distance calculations to determine nearby content, because content in neighboring cells is nearby by definition. Only cell ID information is needed to look up adjacent cell content.

Additionally, and among other benefits, illustrative embodiments and examples described herein facilitate efficient grouping of AR content for other operations. For example, changes can be made in bulk to all AR content in a given cell or cells. For example, communications may be delivered to MDDs located in a given cell or cells, rather than needlessly broadcasting to all MDDs system-wide.

No known system or device can perform these functions, particularly with respect to AR applications. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer-implemented method for locating a computing device, the method comprising:

determining, based on global coordinates representing a location of the computing device on a planet, a row index and a column index of a first cell in a reference grid corresponding to the location of the computing device on the planet, wherein the reference grid comprises a plurality of cells defined to extend over at least a portion of the planet;

converting the row index and the column index into a first cell identifier (ID) identifying the first cell;

querying a data store using the first cell ID to return a first intracellular position of a real-world feature, wherein the first intracellular position is defined with respect to an intracellular coordinate system of the first cell;

sensing a position of the computing device relative to the real-world feature using a sensor of the computing device; and determining, based on the first intracellular position of the real-world feature and the sensed position of the computing device relative to the real-world feature, a second intracellular position of the computing device defined with respect to the intracellular coordinate system of the first cell.

2. The method of claim 1, wherein querying the data store includes selecting a first server from a plurality of servers to query the data store using the first cell ID, and communicating the first cell ID to the first server.

3. The method of claim 2, wherein selecting the first server includes selecting the first server from the plurality of servers based on a geographic distance between the first server and the first cell.

4. The method of claim 3, wherein the geographic distance between the first server and the first cell is greater than a geographic distance between a second server of the plurality of servers and the first cell, and a latency between the first server and the computing device is lower than a latency between the second server and the computing device, and selecting the first server includes selecting the first server based on the lower latency.

5. The method of claim 2, wherein the first server is assigned to the first cell, and selecting the first server includes determining that the first server is assigned to the first cell.

6. The method of claim 1, wherein the intracellular coordinate system of the first cell defines intracellular positions relative to a reference point disposed within the first cell.

7. The method of claim 6, wherein the first cell is dimensioned such that the intracellular coordinate system of the first cell defines intracellular positions within the first cell to a nearest millimeter using numbers having precision no higher than 32-bit.

8. The method of claim 7, wherein each cell of the reference grid has a respective intracellular coordinate system defining intracellular positions relative to a respective reference point, and each cell is dimensioned such that the respective intracellular coordinate system defines intracellular positions within the corresponding cell to a nearest millimeter using numbers having precision no higher than 32-bit.

9. The method of claim 6, wherein the reference point of the first cell corresponds to a geometric centroid of the first cell disposed at mean sea level.

10. The method of claim 1, wherein the cells of the reference grid have identical dimensions.

11. The method of claim 10, wherein the cells are each defined by a four-sided border.

12. A method of locating a computing device, the method comprising:
    determining, based on a set of global coordinates defining a location of the computing device in a global coordinate system, one or more indices identifying a first local cell corresponding to the location, wherein the first local cell is one of a plurality of cells extending across at least a portion of a planet;
    determining, based on the one or more indices, a first cell identifier identifying the first local cell;
    communicating the first cell identifier to a first server;
    receiving at the computing device, from the first server, based on the first cell identifier, first intracellular coordinates defining a position of a real-world feature with respect to a local intracellular coordinate system having an origin within the first local cell;
    sensing, using a sensor of the computing device, information defining a position of the computing device relative to the real-world feature; and
    determining, based on the position of the computing device relative to the real-world feature, second intracellular coordinates defining the location of the computing device with respect to the local intracellular coordinate system.

13. The method of claim 12, further comprising selecting the first server from a plurality of candidate servers based on stored data assigning the first local cell to the first server.

14. The method of claim 12, further comprising selecting the first server from a plurality of candidate servers based on a geographic location of the first server.

15. The method of claim 12, further comprising selecting the first server from a plurality of candidate servers based on a latency between the computing device and the first server.

16. The method of claim 12, wherein the first local cell is dimensioned such that intracellular positions within the first local cell are definable with respect to the local intracellular coordinate system using numbers having precision no higher than 32-bit.

17. The method of claim 12, wherein the first server is configured to query a data store using the first cell identifier to return the first intracellular coordinates.

18. The method of claim 12, wherein the set of global coordinates includes a World Geodetic System (WGS) latitude and a WGS longitude, the one or more indices include a row index and a column index identifying the first local cell, and wherein determining the one or more indices based on the set of global coordinates includes calculating the row index based on the WGS latitude and calculating the column index based on the WGS longitude.

19. The method of claim 18, further comprising receiving at the computing device from the first server, based on the first cell identifier, third intracellular coordinates defining a position of a first augmented reality (AR) content item associated with the first local cell.

20. The method of claim 19, further comprising:
    determining a second cell identifier identifying a second local cell contiguously neighboring the first local cell, wherein determining the second cell identifier comprises incrementing the column index of the first local cell;
    communicating the second cell identifier to the first server; and
    receiving at the computing device from the first server, based on the second cell identifier, fourth intracellular coordinates defining a position of a second AR content item associated with the second local cell.

* * * * *